(12) United States Patent
Richter et al.

(10) Patent No.: US 9,075,822 B2
(45) Date of Patent: Jul. 7, 2015

(54) INCREMENTAL TESTING OF A NAVIGATION DATABASE

(75) Inventors: Jan Richter, Idstein (DE); Martin Pfeifle, Seewald (DE)

(73) Assignee: HERE Global B.V., Veldhoven (NL)

( * ) Notice: Subject to any disclaimer, the term of this patent is extended or adjusted under 35 U.S.C. 154(b) by 148 days.

(21) Appl. No.: 12/931,850

(22) Filed: Feb. 11, 2011

(65) Prior Publication Data

US 2012/0209818 A1    Aug. 16, 2012

(51) Int. Cl.
G06F 17/30    (2006.01)

(52) U.S. Cl.
CPC .... G06F 17/30241 (2013.01); G06F 17/30371 (2013.01)

(58) Field of Classification Search
CPC ............... G06F 8/68; G06F 17/30241; G06F 17/30371; G06F 8/65
USPC ............................ 707/609, 999.102, 999.103
See application file for complete search history.

(56) References Cited

U.S. PATENT DOCUMENTS

| | | | |
|---|---|---|---|
| 5,893,113 A * | 4/1999 | McGrath et al. ................. 701/23 |
| 6,121,924 A | 9/2000 | Meek et al. ............... 342/357.13 |
| 6,601,073 B1 | 7/2003 | Robare .......................... 707/104 |
| 6,684,219 B1 * | 1/2004 | Shaw et al. ............ 707/999.102 |
| 6,826,523 B1 * | 11/2004 | Guy et al. ........................ 703/22 |
| 7,082,443 B1 | 7/2006 | Ashby .......................... 707/201 |
| 7,099,882 B2 | 8/2006 | McDonough ................. 707/100 |
| 7,403,851 B2 * | 7/2008 | Kaufman et al. ............. 701/533 |
| 7,627,632 B2 * | 12/2009 | Douceur et al. .............. 709/205 |
| 2003/0037291 A1 * | 2/2003 | Goldsmith et al. ............. 714/38 |
| 2004/0267441 A1 * | 12/2004 | Kim .............................. 701/200 |
| 2005/0283699 A1 * | 12/2005 | Nomura et al. ............... 714/746 |
| 2009/0024653 A1 * | 1/2009 | Ng et al. ....................... 707/102 |
| 2009/0205012 A1 * | 8/2009 | Jain et al. .......................... 726/1 |
| 2012/0158762 A1 * | 6/2012 | Iwuchukwu ................. 707/759 |

FOREIGN PATENT DOCUMENTS

JP    2002-275856    12/2006    ............. G01C 21/11

OTHER PUBLICATIONS

European Extended Search Report for European Patent Application Serial No. 12154741.8, dated Jun. 19, 2012.
Communication pursuant to Article 94(3) EPC cited in European Application No. 12154741.8, mailed Apr. 13, 2015.
Flament et al., ActMAP Final Report, Jun. 24, 2005, Version 1.0, ActMap Consortium.

* cited by examiner

*Primary Examiner* — Yuk Ting Choi (74) *Attorney, Agent, or Firm* — Lempia Summerfield Katz LLC (57) ABSTRACT

A navigation system utilizes a testing package tailor made for an incremental update to a map database. An incorrect incremental update may corrupt a navigation database. Testing an incrementally updated database after updating allows a corrupted database to be detected before the corrupted database is used by the map database system. Map tiles associated with a list of recompiled objects are used to populate a table. A test script is created from the list map tiles and, when executed, checks the validity of references in the map database associated with the map tiles. The test script generates a return value that indicates whether errors occurred, the type of the errors, the quantity of errors, or any combination thereof. The navigation system analyzes the errors and determines whether to finalize or roll back the update.

20 Claims, 5 Drawing Sheets

INCREMENTAL TESTING OF A NAVIGATION DATABASE

BACKGROUND

The present embodiments generally relate to testing of incrementally updated geographic map related databases.

Map databases are used in computer-based systems that provide useful features to users. For example, navigation systems or devices provide useful features, including the identification of routes to destinations or points of interests. A navigation system determines the optimum route to be taken by the end user to travel from the origin to the destination location from map data stored in a geographic (or map) database. Map databases are also used in advanced driver assistance systems ("ADAS"), such as curve warning systems, adaptive cruise control systems and headlight aiming systems. Map databases are also used in systems that improve vehicle fuel economy, such as systems that optimize transmission gear selection taking into account upcoming slope and speed changes.

As new roads are built, other roads are closed, or locations of business are changed, the geographic database is updated. One way to update map data is to replace the entire existing map database with a new version of the geographic database containing new, updated map data.

However, a replacement of the entire map database is a relatively expensive and time consuming process and may be unnecessary considering that much of the map data may not be changed from the old version to the new version. Partial updates or incremental updates of the map data are possible but introduce the risk that a partial update will introduce inconsistencies between the new and old data.

SUMMARY

A partial update or an incremental update of a map database is designed to be installed on particular prior version of the map database. If the incremental update includes inconsistencies with the data in the prior version, the system in which it is installed may not function properly.

These problems are alleviated by the disclosed method of testing the updated map database. A component of a navigation system receives a list of recompiled objects derived from an update package for updating the navigational database, populates a table with map tiles associated with the recompiled objects, generates a test script including a consistency check algorithm for at least one of the map tiles, and stores the test script in a memory. The component of the navigation system may be a map developer server or a navigation device.

The present invention is defined by the following claims, and nothing in this section should be taken as a limitation on those claims. Further aspects and advantages of the invention are discussed below in conjunction with the preferred embodiments.

DETAILED DESCRIPTION

A geographic database may be updated by replacing all of the map data with a new version. This method may consistently result in a functioning updated geographic database. However, a complete replacement is relatively time consuming and expensive. An incremental update for a geographic database replaces only a portion of a previous version of the database with updated data, while leaving the rest of the database unchanged. In one approach, the incremental update identifies database elements which may include adding new data, removing data, and altering data. Incremental updates reduce the time and costs of an update. However, there exist a risk that partially updating a database may introduce inconsistencies between the old and new data that might cause the system to malfunction or operate improperly.

Standardization of map databases across multiple vendors may result in less control over consistency. An update with inconsistencies may result in a database that includes references to or from objects that do not exist, which may cause incorrect operation. To avoid these risks, the incremental update may be performed along with incremental testing.

A navigation system utilizes a testing procedure embodied in a test package, which is made for a particular updating procedure embodied in an update package. The test package may be combined with an update package. The testing procedure allows the update to be tested before the update is committed to the map database. A test function checks the validity of references in the map database associated with only the updated portions of the map. The testing procedure may require only seconds, as compared to hours for testing of complete (continental) databases. The navigation system analyzes the result of the test function to determine whether to finalize or roll back the update.

For the purposes of discussion, the data of the map database is described in terms of map tiles and objects. A map tile, which may be referred to as a database file or a database entry, includes a list of objects and a tile identification value. An object may be a graphical representation of a real world feature included in the map tile. Objects may include segments, links, nodes, edges, faces, and names. The objects may be organized in layers. The objects may be further described by characteristics. Characteristics may include turn restrictions, addresses, signs, speed limits, or any other supplementary information.

A map tile may include data organized in binary large objects (BLOBS), which is a set of binary data stored as a single entity. The map tile corresponds to a square or other shape on the earth representing the data of a certain region. The map tiles may be defined using a map scale value. A BLOB is stored in a relational database. The relational database may be structured in tables of rows and columns. The BLOBS may be organized into rows in the relational database.

Formats such as the physical storage format (PSF) proposed by the Navigation Data Standard (NDS) initiative may be used for the map database. Alternatively, any geographic information format may be used, including generic or proprietary formats. The geographical database may include node and link information. A link is bound on either end by a node.

A node may be an intersection, the end of a road, or a change in a road. Each node is a location on the surface of the Earth and may be represented by a longitude coordinate and a latitude coordinate. The link may be a stretch of road or pathway. Other terminologies may be used to describe the map data.

The following embodiments provide example implementations of testing an incrementally updated map database. Other embodiments are possible.

Figure 1A:
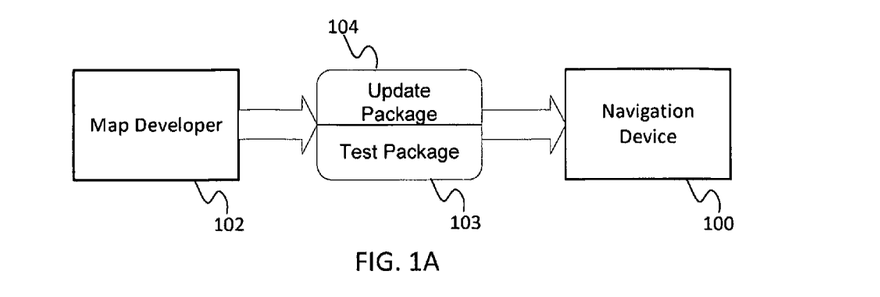
FIG. 1A illustrates an example embodiment for delivering a combined update and test package to a navigation device.

FIG. 1A illustrates a first embodiment of a navigation system. The navigation system includes a map developer 102 and a navigation device 100. The map developer 102 may be any entity for producing and/or maintaining geographic data such as NAVTEQ North America, LLC located in Chicago, Ill. The map developer 102 may distribute an original or other version of the map database to one or more navigation devices. Alternatively, the map developer 102 may distribute a version of the map database in an intermediate (or interchange) format (such as the GDF format) to one or more other entities, such as navigation system manufacturers ("system vendors"), original equipment manufacturers ("OEMs"), or other entities, which compile the map database from the intermediate format into a compiled format (such as the NDS format) suitable for installation and use in the navigation device 100. The map developer 102 may continue to collect map data for new geographic areas or for changes that are made to geographic areas already included in the original version. The map developer 102 (or intermediate entity) generates an update package 104 (e.g. patch) to incrementally update the map database to include the new geographic areas or updates.

The update package 104 may include a subset of the map data of the map database less than the entire map database. The update package 104 may include an updated map tile or recompiled map tile for each map tile to be updated. Alternatively, the update package 104 may include updated object information rather than an updated tile (i.e., only a portion of a given tile is updated). The update package 104 may be for any number of objects, nodes, links, tiles, characteristics, or other data division. The update package 104 may be for updating or replacing a large amount (e.g., 50% or more) of the database or a small amount (e.g., update one or more of thousands or millions of records).

An update application on the navigation device 100 incorporates the update package 104 into the original map database. In one implementation, the update package 104 includes instructions for the update application to incorporate the update package 104 into the original map database or other version of the map database.

The incremental update instructions for a map database are stated in terms of a known dataset. The incremental update instructions contain a reference to a database tile and a description of an alteration to the tile. The incremental updates may be a transaction that contains an ordered set of steps of adding, changing, and/or deleting objects and/or characteristics in the map database.

The map developer 102 may also generate a test package 103. The test package 103 may be combined with the update package 104. The test package 103 includes a test script for testing the incrementally updated update package 104. The test script may include a test command (test function) for each of the recompiled map tiles of the update package 104. The test script may be derived from a list of objects or a list of recompiled map tiles used to create the update package 104. In this way, a test script is generated for each update package. The test script is executed by a test application on the navigation device 100. As shown in FIG. 1A, the map developer 102 may generate the test package 103 and the update package 104, combine the test package 103 and the update package 104, and deliver the test package 103 and the update package 104 to the navigation device 100. The test package 103 and update package 104 may be delivered separately. The test package 103 may be an application operated independently of the map developer 102 and/or independently of the specific update package 104. For example, the test package 103 may be a program for testing use of any tile. The updated tiles are identified from the update package 104 and tested.

Figure 1B:
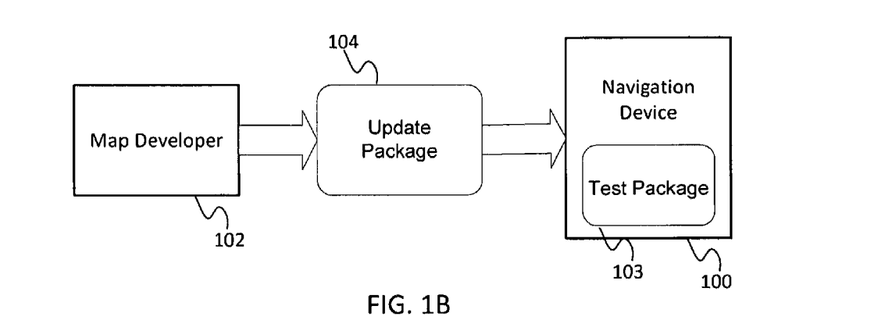
FIG. 1B illustrates an example embodiment for generating a test package at a navigation device.

FIG. 1B illustrates a second embodiment of a navigation system. In FIG. 1B, the map developer 102 generates the update package 104 and communicates the update package 104 to the navigation device 100. The update package 104 includes a list of objects or a list of recompiled map tiles. The navigation device 100 includes a test application configured to generate the test package 103 from the list of recompiled map tiles.

Figure 1C:
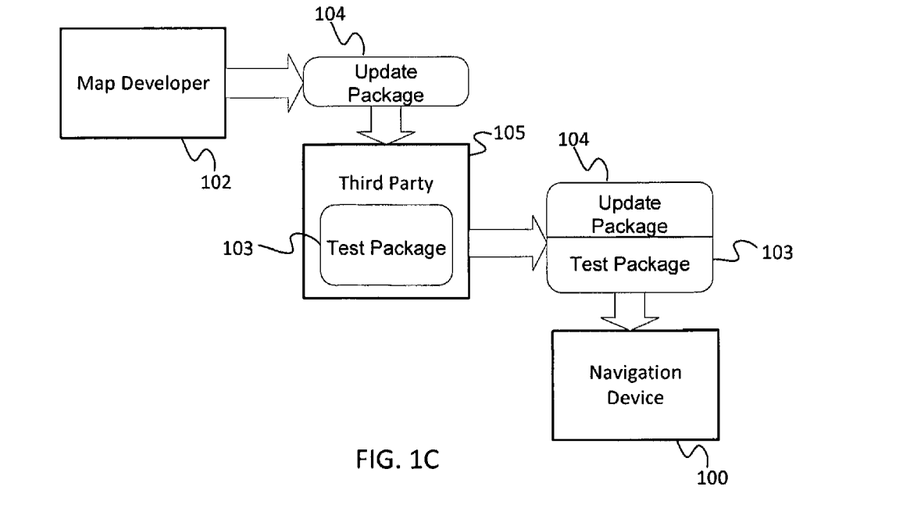
FIG. 1C illustrates an example embodiment for generating a test package at a third party.

FIG. 1C illustrates a third embodiment of a navigation system. In FIG. 1C, the map developer 102 generates the update package 104 and communicates it to a third party device 105. The third party device 105 generates the test package 103 from a list of recompiled map tiles or a list of updated objects. The third party device 105 may be a computer configured to communicate with the navigation device 100. The third party device 105 may be implemented using cloud computing or through another system via the Internet. The third party device 105 communicates the update package 104 and the test package 103 to the navigation device 100.

Figure 2:
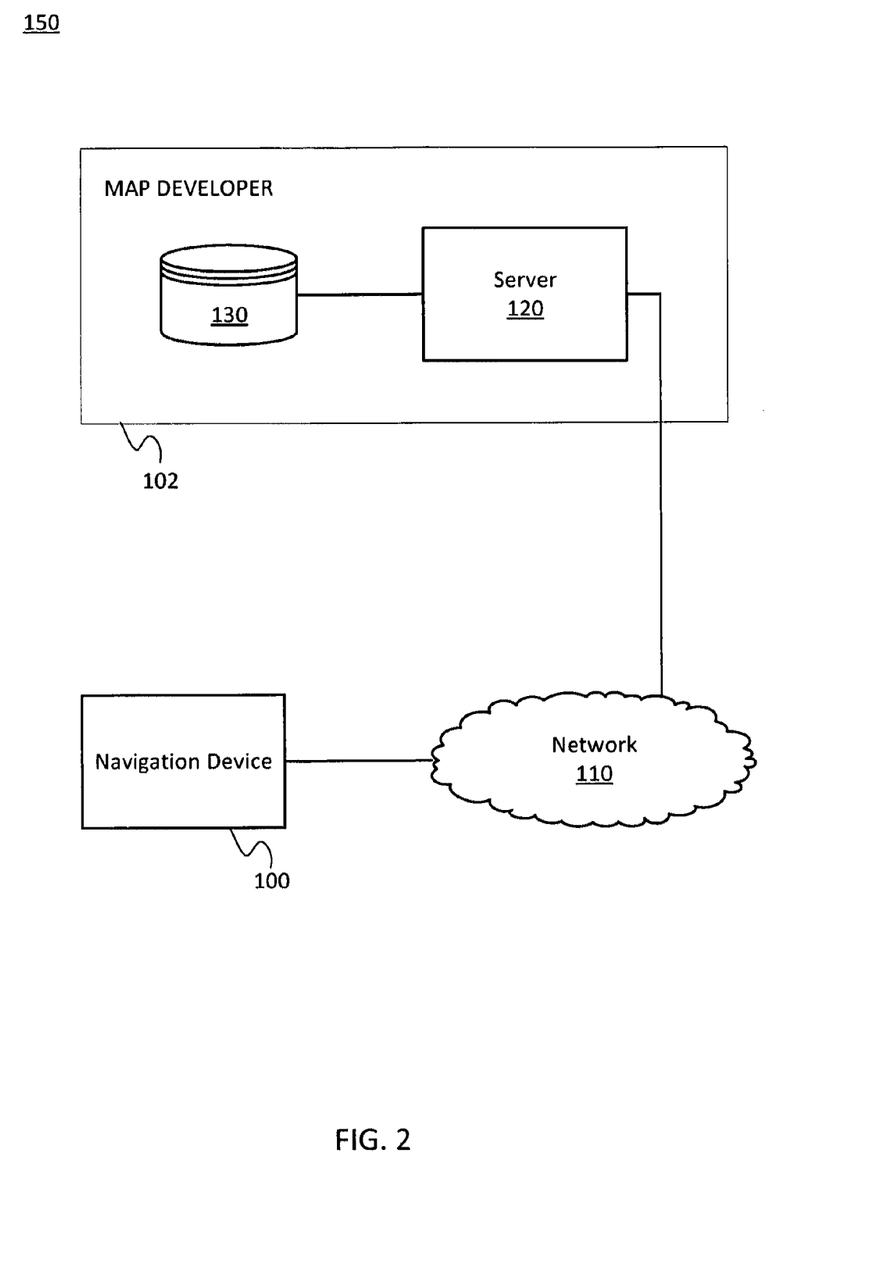
FIG. 2 illustrates an example navigation system including a navigation device and a map developer.

FIG. 2 illustrates a navigation system 150 including a navigation device 100 and a map developer 102. The navigation device 100 may be a cellular telephone, a mobile phone, a smart phone, a personal digital assistant ("PDA"), a camera, a tablet computer, a laptop, a personal navigation device ("PND"), or any portable navigation device. The navigation device 100 may be mounted in an automobile as a head unit or incorporated into an audio system. Alternatively, the navigation device 100 is a server, database, or processor for providing navigation map data as needed by other devices. The navigation device 100 includes a network interface for wirelessly or wired connection to the network 110. The map developer 102 includes at least a map database 130 and a server 120. The map database 130 includes map data and other data for navigation-related services.

The map developer 102 communicates the update package 103 or the combination of the update package 103 and test package 104 to the navigation device 100 by way of the network 110. The network 110 and the communication paths between the map developer 102 and the network 110 may be any protocol or physical connection that is used to couple a server to the navigation device 100. The communication paths may utilize cellular (e.g. 3G, 4G, or WiMAX), Ethernet, wireless, or any Internet protocol technologies. Alternatively, the network 110 may be a private network that may not be connected to the Internet, a peer to peer network, or an ad-hoc network, such as a mobile mesh network including mobile devices and wireless links. In other embodiments, the navigation device 100 is connected through a wire, such as USB cable, to the network 110.

Alternatively, the network 110 may be omitted. For example, the map developer 102 may communicate the update package 103 or the combination of the update package 103 and test package 104 to the navigation device 100 by way of a storage medium. The storage medium may be a flash memory, a memory card, a compact disc, or a diskette. The storage medium may store the update package 103 or the combination of the update package 103 and test package 104 and be distributed from the map developer 102 to the end user and connected to the navigation device 100.

Figure 3:
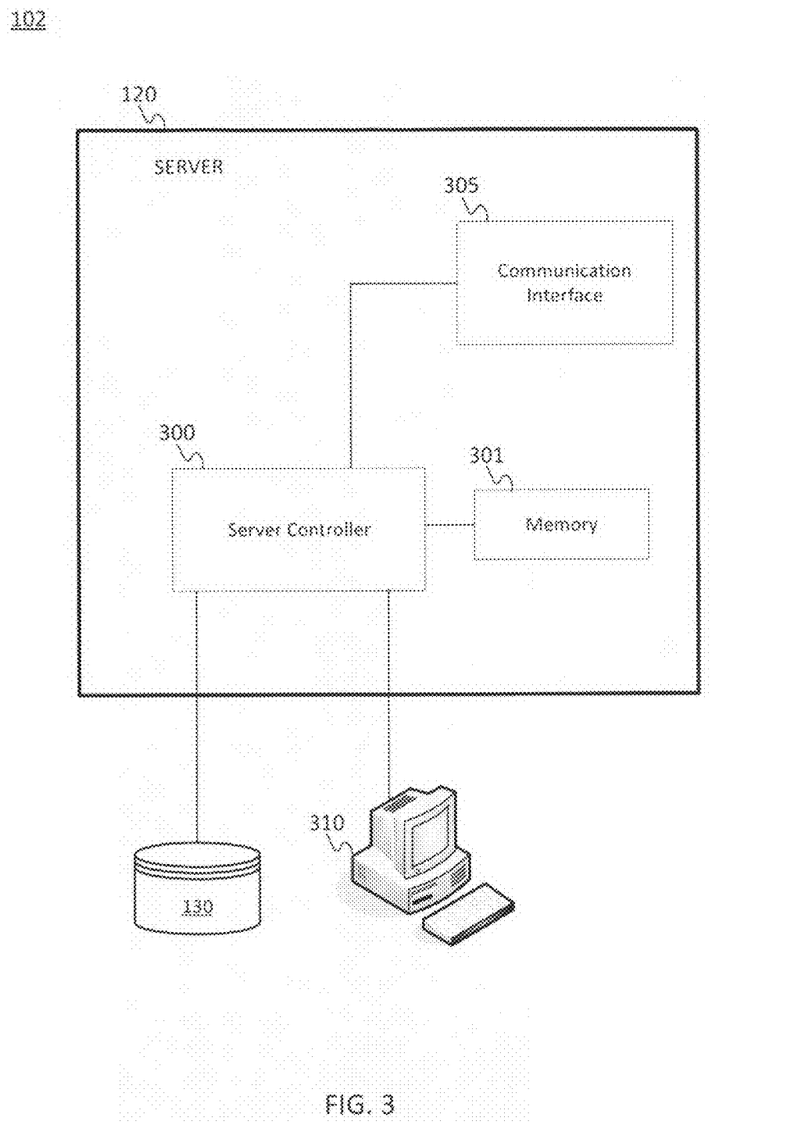
FIG. 3 illustrates a block diagram of the map developer of FIG. 2.

FIG. 3 illustrates a block diagram of the map developer 102 of FIG. 2. In addition to the map database 130 and the map developer server 120, the map developer 102 may include a workstation 310. The map developer server 120 may include a server controller 300, a memory 301, and a communication interface 305. Additional, different, or fewer components may be used.

The map developer 102 may be configured to generate the update package 104. The update package 104 may include update instructions. The update instructions may be a plurality of update commands using structured query language (SQL) or another language, such as Java or C++.

An example update command may be expressed as "UPDATE routingTileTable SET RoutingTile=NEWRoutingTile WHERE RoutingTile=4711". The update instructions may include a few to thousands or more update commands. The update commands may specify map tiles, objects, or characteristics that are being changed by the incremental update. However, the update commands may also affect other tiles, objects, or characteristics. For example, if a link (e.g. a road) in one map tile is added adjacent map tiles that reference into this tile may also require updating. The map database may be updated from a first version of geographic data to a second version of geographic data, such that a first map tile in the first version of geographic data remains in the second version of geographic data and a second map tile from the first version of geographic data is changed in the second version of geographic data.

The map developer 102 has access to a list of recompiled objects or map tiles. The list may be generated at the map developer 102 as part of the generation of the update package 104. Alternatively, the list of recompiled objects or map tiles may be received from an external source or constructed from an analysis of the update package 104. The list of recompiled objects may specify a list of map tiles by name (e.g. RoutingTile=[4711] or RoutingTile=[4711, 3943, 2321]).

The server controller 300 is configured to receive the list of recompiled objects and populate a table with map tiles associated with the recompiled objects. The server controller 300 is also configured to generate a test script from the list of recompiled objects. The test script is designed to check whether all reference to and from each of the recompiled objects are valid based on the data contained in the update package 104. As an alternative to automated test script generation, a programmer may create and upload the test package to the server controller 300 or memory 301.

The test script is made up of a plurality of test cases. The test cases may be consistency check algorithms expressed in SQL or by another method. A test case may be applied to only a part of the map database 130 by using the "where" qualifier in SQL or by other restrictions. For example, consider a map database including the table "routing (tileID, tileData)" using a consistency check algorithm stored as "CheckConsistency". In this scenario, a test command may be "SELECT tileID FROM routing WHERE CheckConsistency(TileData)=−1 and TileID=4711". The test script may include a test command for each of the updated map tiles or updated objects in the list. The consistency check algorithm determines whether references in the map database 130 to the at least one of the map tiles and from the at least one of the map tiles are valid.

As shown in the test command above, the return value for an error may be −1. Alternatively, the return value for an error may be another value or the function may return the tile identification value (tileID) of the map tile containing the error. When the test command is executed on the map database 130 and the test command does not return any records, the map tile 4711 of update package 104 has passed the test. The results of the test may be communicated back to the server controller 300, which is configured to analyze the result of the test command and identify the test script as either no errors, fatal errors, or minor errors.

Alternatively, the test command may specify a plurality of updated objects or map tiles. For example, the update package 104 may include the list of updated objects or map tiles as routingTilesToCheck. The list of updated map tiles may be indexed in a table by TileID. A test command may be "SELECT tileID FROM routing WHERE CheckConsistency (TileData)=−1 and TileID in (SELECT TileID FROM routingTilesToCheck)". The test command may return the map tiles or objects that have failed the test. The test command requires much less processing resources and time than a test on the complete map database 130.

As another implementation alternative to SQL, the test package 103, or the combined test package 103 and update package 104 may be hard coded as a dedicated software package distributed by the map developer 101. The dedicated software internally provides the return value and decides whether to commit or reject the update package 104. The dedicated software package may be written in Java, C++, Visual Basic, or another language. Further, the dedicated software package may be a dynamic link library (DLL).

As discussed above, a table of map tiles or objects associated with the update package 104 may be populated by the map developer server 120 to create the test package 103. The test package 103 may be executed on the updated database using the update package at the map developer 101 (before the update package 104 is offered to the end user). The database may be a specified baseline version of the map database 130, or a set of possible baseline versions of the map database 130. Alternatively, the combined update package 104 and test package 103 are provided to the navigation device 100. The navigation device 100 executes the update package 104 and subsequently executes the test package 103 in succession or executes both as a single transaction. In yet another alternative, the map developer server 120 may generate only the update package 104 and the navigation device 100 may generate the test package 103.

Figure 4:
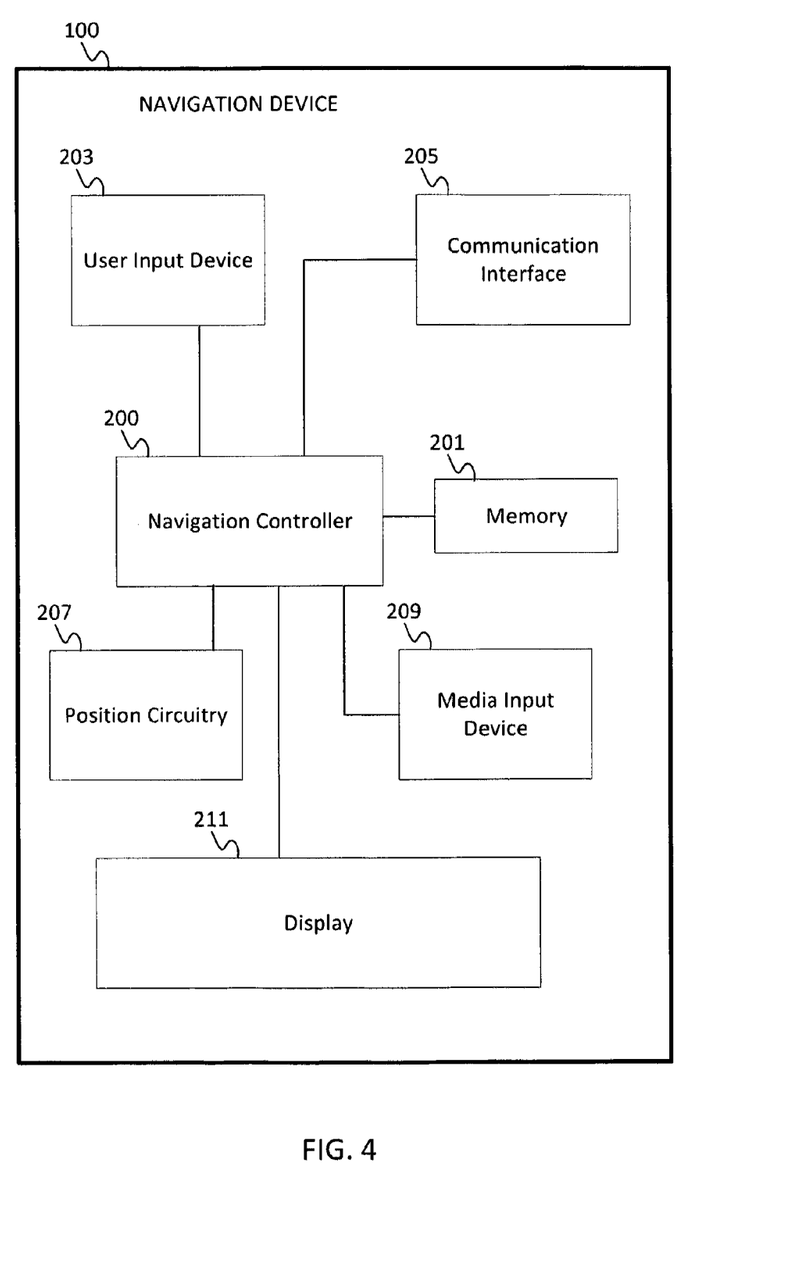
FIG. 4 illustrates a block diagram of the navigation device of FIG. 2.

FIG. 4 illustrates a block diagram of the navigation device 100 of FIG. 3. The navigation device 100 includes a navigation controller 200, a memory 201, a user input device 203, a communication interface 205, position circuitry 207, a media input device 209, and a display 211. Additional, different, or fewer components may be provided.

The navigation controller 200 may include a general processor configured to execute instructions for incrementally updating and testing the map database 130. The navigation controller 200 receives the list of map tiles or recompiled objects from the map developer 102 by way of communication interface 205. The navigation controller 200 populates a table with the map tiles associated with the recompiled objects.

The memory 201 stores a test script including a consistency check algorithm for at least one of the map tiles. For example, the test script may include a plurality of test commands. Each of the test commands calls the table of map tiles for a specific updated tile and checks all of the references made from the updated tile or to the update tile. The updated tile is considered valid when each of the references made in the map tile point to existing map tiles or existing objects.

The navigation controller 200 receives a return value from the test script. The return value may indicate that the update package 104 passes the test or that there were errors. The return value may include the tile identification value of one or more map tiles containing errors. If the return value indicates that there were no errors, the navigation controller 200 may finalize the update package 104. If the return value indicates that the number of errors exceeds a threshold value (e.g., 1, 5, or 10 errors), the navigation controller 200 may roll back the update package 104 such that the map database 130 reverts to the original or previous version.

The navigation controller 200 may log the return value in an error report stored in memory 201. The error report may be presented to the user or communicated to the map developer 102. The navigation device 100 may give the user the option of committing the update package 104 or removing the update package based on the error report. The user may enter a command to keep or reject the update package 104 by way of the user input device 203.

The user input device 203 includes one or more buttons, keypad, keyboard, mouse, stylist pen, trackball, rocker switch, touch pad, voice recognition circuit, or other device or component for inputting data to the navigation device 100. The user input device 203 and the display 211 may be combined as a touch screen, which may be capacitive or resistive. The display 211 may be a liquid crystal display (LCD) panel, light emitting diode (LED) screen, thin film transistor screen, or another type of display. The user input device 203 may be configured to permit the user to reject all or accept all updates and to enable or disable the testing feature.

The navigation controller 200 may include a general processor, digital signal processor, an application specific integrated circuit (ASIC), field programmable gate array, analog circuit, digital circuit, combinations thereof, or other now known or later developed processor. The navigation controller 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the navigation device 100, such as a secure digital (SD) memory card. The memory 201 is configured to store the test script including the consistency check algorithm for at least one of the map tiles.

The communication interface 205 may include any operable connection. An operable connection may be one in which signals, physical communications, and/or logical communications may be sent and/or received. An operable connection may include a physical interface, an electrical interface, and/ or a data interface. The communication interface 205 provides for wireless and/or wired communications in any now known or later developed format.

The position circuitry 207 may include one or more of a variety of global navigation satellite systems such as Global Positioning System (GPS), the Russian GLONASS or European Galileo. The navigation satellite system may be supplemented, or in some implementations replaced by alternative location systems such as triangulation and/or relative position sensors. In triangulation, the position circuitry 207 includes a signal strength sensor or an array of signal strength sensors configured to measure the signal level from two or more antenna. The navigation controller 200 calculates the position of the navigation device 100 from the signal strength measurements. Triangulation may be used in cellular networks, Bluetooth, or in wireless LAN and wireless mesh, as described in the IEEE 802.11 family of standards.

The position circuitry 207 may also include relative position sensors in an inertial position system or dead reckoning system. Relative positions sensors include but are not limited to magnetic sensors (e.g., magnetometers, compasses), accelerometers, gyroscopes, and altimeters. Magnetic sensors determine the direction and or strength of a magnetic field and can be used to determine heading or orientation. Inertial sensors such as accelerometers and gyroscopes measure acceleration, which can be used to calculate position, orientation, and velocity (direction and speed of movement) of the navigation device 100.

The media input device 209 may include a memory card interface, a universal serial bus (USB) interface, or a disk drive. The media input device 209 may receive the update package 104 and/or the test package 103. For example, the map developer 102 may store the update package 104 and/or the test package 103 on a compact disk, memory card, or other storage medium that interfaces directly with the media input device 209. Alternatively, the third party device 105 may be a laptop or other computing device that receive the update package 104 and/or the test package 103 from the map developer and delivers the update package 104 and/or the test package 103 to the media input device 209.

The map database 130 may be a memory, hard drive, flash drive, or any storage device. Further, various implementations of the server controller 300, the memory 301, and the communication interface 305 may be made in the manner discussed above with respect to the navigation controller 200, the memory 201, and the communication interface 205, respectively.

Figure 5:
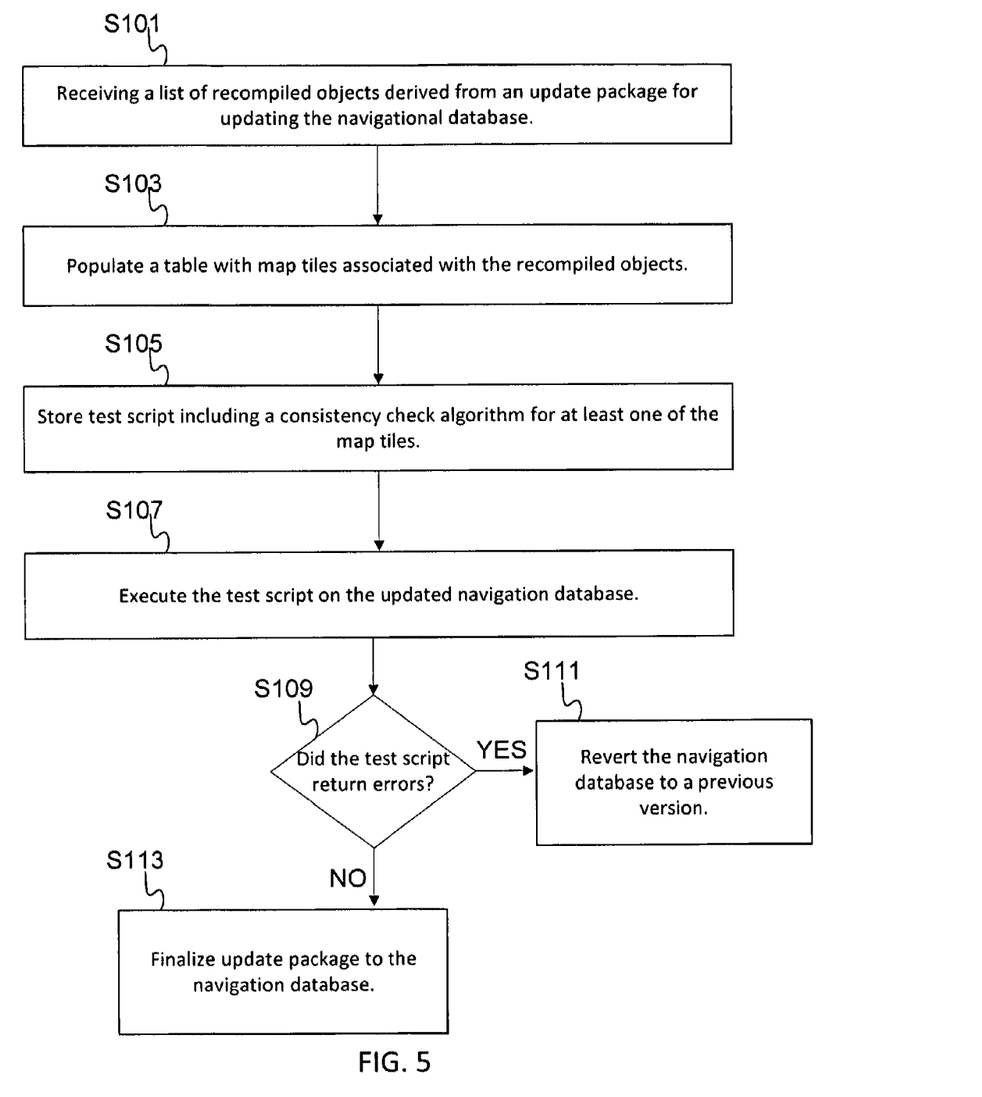
FIG. 5 illustrates an example embodiment of an algorithm for testing an incrementally updated map database.

FIG. 5 illustrates an example embodiment of an algorithm for testing the incrementally updated map database 130. The testing package 103 may be generated by the map developer 102, the navigation device 100, or a third party device 105. The testing package 103 may be generated before, after, or concurrent to the execution of the update package 104. For example, the map developer 102 may generate the test package 103 before the navigation device 100 executes the update package 104 so that the test package 103 and the update package may be stored together. In addition, the navigation device 100 may generate the test package 103 before, during, or after the update package 104 is installed on the navigation device 100. Regardless of when the update occurs, a list of objects or map tiles may be derived from the update package 104. Either the map developer 102 or the navigation device 100 may derive the list.

The algorithm for testing the map database 130, as shown in FIG. 5 may be performed by either the map developer 102 or the navigation device 100. The following discussion of the algorithm applies to either scenario and the term controller refers alternatively to the server controller 300 or the navigation controller 200 and the term memory refers alternatively to the respective memory 301 or memory 201.

At act S101, the list of recompiled objects, tiles, or characteristics derived from the update package 104 are received at the controller. The list of recompiled objects may be a list of map tiles (e.g., an array of map tile values) or a list of links or nodes. At act S103, the controller populates a table with the map tiles. In the case that the list of recompiled objects includes links or nodes, the controller populates the table with the map tiles that include any of the links or nodes.

The controller generates a test script including a consistency check algorithm for at least one of the map tiles. The consistency check algorithm may be written in SQL logic. For example, the test script may define the table as "routingTilesToCheck" by TileID and a test command as "SELECT tileID FROM routing WHERE CheckConsistency (TileData)=−1 and TileID in (SELECT TileID FROM routingTilesToCheck)". The CheckConsistency function determines whether references within each of the plurality of map tiles are valid, whether references to each of the plurality of map tiles are valid, or both. At act S105, the memory stores the test script including the consistency check algorithm.

At act S107, the controller executes the test script on the updated map database 130. The test command may return −1 in the case of one or more errors. The test command may return the number of errors or an array of the map tiles or objects that have failed the test. At act S109, the controller determines whether the test script returned errors. If the test script returned errors, the controller removes the update package 104 or otherwise reverts the map database 130 to a previous version, at act S111. If the test script did not return errors, the controller finalizes or commits the update package 104 to the map database 130.

Alternatively or in addition, the controller may be configured to analyze the errors and characterize the errors as harmless, non-critical, or critical. The memory is configured to store a threshold value for the total number of errors or a threshold value for the number of critical errors. At act S109, the controller determines whether the number of errors exceeds the threshold value or the number of critical errors exceeds the threshold value. Different types of errors may have different thresholds. For example, a single critical error may be sufficient to roll back the update. At act S113, the controller approves the update package 104 if the actual number of errors is less that the threshold value. The threshold value may be 1, 10, 100, or any number and may be specified by the user using the user input device 203.

In this way, the algorithm for testing the incrementally updated map database 130 prevents an incremental update to the map database 130 from making the map database 130 inoperable or faulty. If any of the references from or to the updated routing data are found to be invalid, the incremental update is rolled back. Accordingly, incremental updates to the map database 130 are more secure and reliable.

The embodiments described above may be implemented using computer executable instructions stored in the memory 201 and/or the memory 301, which are non-transitory. The processors may execute computer executable instructions. The computer executable instructions may be written in any computer language, such as C++, C#, Java, Pascal, Visual Basic, Perl, HyperText Markup Language (HTML), JavaScript, assembly language, extensible markup language (XML) and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method of testing an incrementally updated map database, the method comprising:
   receiving a list of objects derived from an update for the map database;
   populating a table with map tiles associated with the objects, wherein the table includes a first map tile and a second map tile that is adjacent to the first map tile;
   generating a test script including a consistency check algorithm for the first map tile associated with one or more of the objects of the update and the second map tile associated with one or more of the objects of the update, wherein the consistency check algorithm is configured to determine whether references of the second map tile to all objects associated with the first map tile are valid and whether references of the first map tile to all objects associated with the second map tile are valid;
   storing the test script in a memory;
   executing the test script on the navigation database to generate a return value, wherein the memory stores a threshold value; and
   finalizing the update package to the navigation database when the return value indicates errors less than the threshold value and roll back the update package when the return value indicates errors in excess of the threshold value.

2. The method of claim 1, wherein the test script includes a test command for each of the map tiles.

3. The method of claim 1, wherein the first map tile includes a tile identification value and tile data including nodes and segments.

4. The method of claim 1, wherein the test script is uniquely generated for the update.

5. The method of claim 1, further comprising:
   sending the update and the test script to a navigation device, wherein the memory is located in a map developer server.

6. The method of claim 1, wherein the memory is located in a navigation device and the update is received from a map developer server.

7. The method of claim 1, wherein the test script comprises structured query language.

8. An apparatus for testing an incrementally updated map database, the apparatus comprising:
   a memory configured to store a table populated with a first plurality of map tiles associated with an update package for updating the map database, wherein the plurality of map tiles includes a first map tile geographically adjacent to a second map tile; and
   a controller configured to generate a test script including a consistency check algorithm for the first plurality of map tiles, wherein the consistency check algorithm determines whether references between the first map tile and objects in the map navigation database are valid, and wherein the consistency check algorithm is further configured to determine an error type of a plurality of error types for the first map tile when the first map tile is found invalid, and the error type is determined based on a comparison between a number of errors determined for the first map tile and a plurality of error type thresholds, each of the error type thresholds corresponding to a particular error type, and the controller is further configured to finalize the update package to the navigation database when the comparison indicates that the number of errors of the error types is less than the error type threshold value for the particular error types and roll back the update package when the number of errors of the error types is more than one of the particular error type threshold values.

9. The apparatus of claim 8, wherein the controller is a map developer controller and generates the update package associated with the list of recompiled objects.

10. The apparatus of claim 8, wherein the controller is a navigation device controller and derives the list of recompiled objects from the updated package received from the map developer.

11. The apparatus of claim 8, wherein the test script includes a test command for each of the map tiles.

12. The apparatus of claim 8, wherein the consistency check algorithm determines whether references in the map database to the at least one of the map tiles and from the at least one of the map tiles are valid.

13. The apparatus of claim 8, wherein the at least one map tile includes a tile identification value and tile data including nodes and segments.

14. The apparatus of claim 8, wherein the test script comprises structured query language.

15. The apparatus of claim 8, wherein the controller is configured to execute the test script on the map database to generate a return value.

16. The apparatus of claim 15, wherein the controller is configured to finalize the update package to the map database when the return value indicates no errors and revert to a previous version of the map database when the return value indicates one or more errors.

17. An apparatus for testing an incrementally updated navigation database, the apparatus comprising:
a memory configured to store a table populated with a first plurality of map tiles associated with an update package for updating the navigation database,
wherein the plurality of map tiles includes a first map tile geographically adjacent to a second map tile; and
a controller configured to generate a test script including a consistency check algorithm for the first plurality of map tiles,
wherein the consistency check algorithm determines whether all references between the first map tile and the second map tile are valid and whether all references to each of the first plurality of map tiles from any of a second plurality of map tiles are valid,
wherein the controller is configured to execute the test script on the navigation database to generate a return value of invalid references, wherein the memory stores a threshold value and the controller is configured to finalize the update package to the navigation database when the return value indicates errors less that the threshold value and configured to roll back the update package when the return value indicates errors in excess than the threshold value.

18. The method of claim 1, wherein a reference is valid when the reference points to an existing object in the map database, and the first map tile is considered valid when all references between the first map tile and other tiles of the map database are determined to be valid.

19. The method of claim 1, wherein the consistency check algorithm is further configured to determine an error type of a plurality of error types for the first map tile when the first map tile is found invalid.

20. The method of claim 19, wherein the error type is determined based on a comparison between a number of errors determined for the first map tile and a plurality of error type thresholds, each of the error type thresholds corresponding to a particular error type.

* * * * *